March 22, 1927.

A. W. STEVENS 1,622,125

AIRPLANE VIEW FINDER

Filed March 15, 1924    2 Sheets-Sheet 1

INVENTOR
A. W. Stevens
BY
Robert H. Young   ATTORNEY

March 22, 1927.
A. W. STEVENS
1,622,125
AIRPLANE VIEW FINDER
Filed March 15, 1924   2 Sheets-Sheet 2
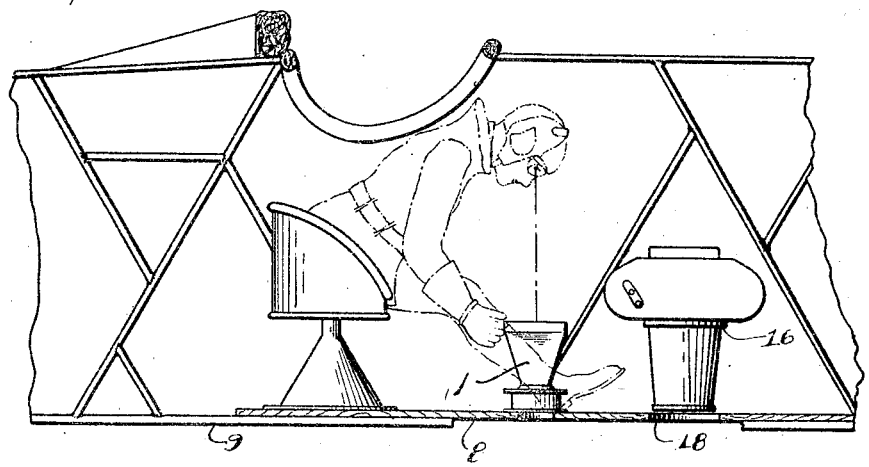
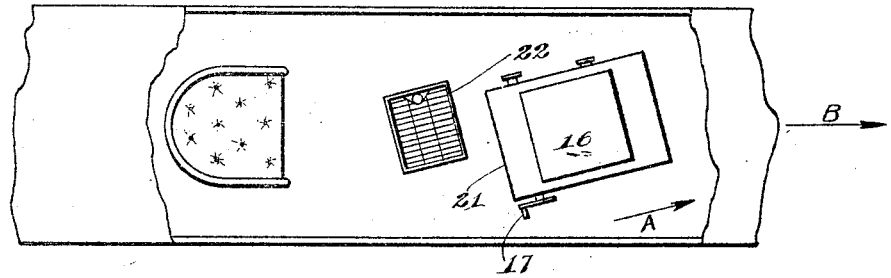
INVENTOR
A. W. Stevens
BY
Robert H. Young ATTORNEY Patented Mar. 22, 1927.

1,622,125

UNITED STATES PATENT OFFICE.

ALBERT W. STEVENS, OF DAYTON, OHIO.

AIRPLANE VIEW FINDER.

Application filed March 15, 1924. Serial No. 699,854.

This invention relates to a view finder for use in aircraft in conjunction with a camera.

The main object of the invention is the provision of a view finder which may be readily adjusted so as to be correctly positioned to indicate that portion of the ground which is directly beneath the airplane and which will instantly show how the camera should be adjusted so as to take a picture whose sides will be parallel to the direction of travel in relation to the ground.

Further objects are the provision of a ball and socket joint or mounting for the base of the view finder and the provision of a rectangular upper portion of the view finder so that it may readily be observed when the sides of the view finder are parallel with the adjacent side of the camera.

It is also an object of this invention to provide limit-defining lines so that the reflection of the ground on the ground glass screen as the objects travel past the lens will give an indication of when to take a picture and also furnish a basis for the computation of how much exposure should be given to the film.

Further additional objects will be more fully set forth in the attached specification and claims, and in the drawings, in which:

Fig. 3 is a sectional view of an airplane showing the camera and the view finder mounted in their respective positions, and Fig. 4 is a plan view partly broken away of Fig. 3.

Figure 1:
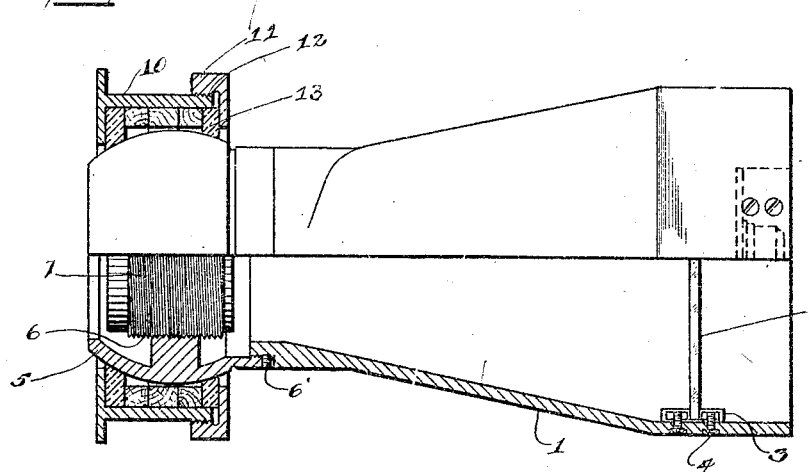
Fig. 1 is a part sectional view of the view finder.
Figure 2:
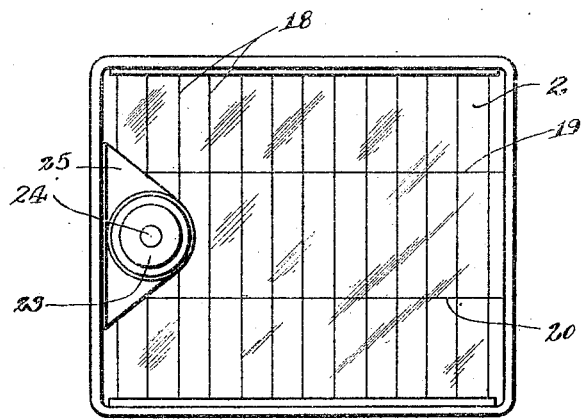
Fig. 2 is a plan view shown of the ground glass view screen.

The view finder consists of an upwardly flaring casing 1 having a general rectangular cross sectional shape and which may be formed of any suitable material such as duralumin. A ground glass view screen 2 is held near the upper end of this flaring casing by means of a suitable holding strip and screws 3 and 4 respectively. Attached to the smaller end of this casing 1 is a part-spherical base member 5 which is united to casing 1 by means of suitable screw threads and locking bolt 6'. The spherical member 5 is provided with internal screw threads 6 in which is adapted to be screwed a lens mount 7 which serves as a holder for a suitable lens which provides an image of the ground to be shown upon the ground glass screen 2 when the view finder is held in a substantially vertical position looking through a hole in the floor 8 of an airplane 9 as shown in Fig. 3. The view finder is frictionally supported for universal movement in a holder consisting of two socket members 10 and 11 having engaging screw threads 12, suitable packing of wood or other similar material 13 being provided between members 10 and 11 and part 5. The socket member 10 is attached to the flooring 8 by any suitable means.

A camera 16 is mounted in front of the obsever of an airplane as shown in Figs. 3 and 4 so as to be adjustable about a vertical axis and so that its vertical axis may be tilted in any direction. Suitable handle 17 is provided on the camera for the operation of the film and the hole 18 is provided in the floor of the fuselage through which the pictures are taken of the ground located directly below the airplane. The view finder is located immediately to the rear of the camera.

The ground glass view screen of the view finder is provided with a series of parallel lines 18 which are adapted to be aligned with the travel of the objects shown upon the screen. If the airplane is traveling in the direction of the arrow B of Fig. 4, and there is no cross wind, the view finder would then be located so that these lines 18 are parallel with the longitudinal axis of the airplane. If however, there is a cross wind so that the true travel of the airplane with relation to the ground would be represented by the arrow A of Fig. 4, it would then be necessary to rotate the view finder about its vertical axis so that the lines 18 would be parallel with the path of the objects shown on the screen. After such an adjustment has been made, a measurement of the time is made which is required for an object to pass from a line 19 to line 20, both of these lines being arranged at 90° to the lines 18. Such a measurement of the time will give an indication of how long an exposure should be made as the time required for an object to travel between lines 19 and 20 will be proportional to the height of the airplane above the ground. The camera 16 would then be rotated about its vertical axis so that the rear edge 21 of the camera would be observed to be parallel to the front edge 22 of the view finder. The front edge 22 of the view finder is arranged at right angles to the lines 18. Since the edges 21 and 22 of the camera and of the view finder are adjacent and are perfectly straight, it is an easy matter to adjust the camera so that the succession of pictures it will take will represent portions of the earth perfectly in front of each other. If the view finder is observed at the time of taking a picture, and an object noted which will be under the line 20, when this object has reached the line 19, it will then be the proper time to take a second picture, the lines 19 and 20 serving as limit-defining lines and indicating the amount of overlap which should be allowed on the successive pictures.

It is not necessary to arrange the view finder and camera so that their axes are exactly vertical, but a small angle of tilt may be allowed for each of these parts, care however being taken at all times to see that the camera is adjusted so that the straight edge 21 of the same is parallel to the top straight edge 22 of the finder. A suitable level 23 containing any desired liquid and having a bubble 24 is held by a bracket 25 on the upper end of the flared casing which will indicate when the view finder is held in a vertical position or the approximate tilt of the same.

I claim:

1. A view finder for aircraft comprising an upwardly flaring rectangular casing, a view screen in the flared end thereof, a lens, a universal mount for said lens attached to the smaller end of the casing and enclosing said lens, said mount having a spherical contour externally, and means for frictionally holding said mount in position on an aircraft.

2. A view finder for use with an adjacent movably mounted camera on aircraft, comprising a casing, means mounting said casing for universal movement about its lower end, a view screen in said casing, lines on said screen for alignment with the direction of travel, other lines on the screen for aiding in the determination of the time of exposure and the instant to take successive exposures, said casing being provided with a rectangular upper end so that the sides thereof may be readily aligned with the sides of an adjacent camera.

3. A view finder for use with an adjacent movably mounted camera, comprising a casing, a ball and socket joint at the lower end thereof, to frictionally and universally support said casing, a view screen in the upper end of the casing, lines on said screen for alignment with the direction of travel, other lines for aiding in the determination of the time of exposure and the position of the overlap of successive exposures, said casing being provided with a rectangular upper end so that the sides thereof may be readily aligned with the sides of the adjacent camera.

4. A view finder of the class described, comprising an upwardly flaring casing of general rectangular cross sectional shape, a view glass screen in the upper end thereof, a line on said screen adapted to be aligned with the direction of travel, a plurality of lines on said screen at right angles to the first said line for aiding in the determination of the time of exposures and the point of overlap of successive exposures, a level device supported by the upper end of said casing, a part-spherical frame member, means for attaching said frame member to the lower end of the casing, an internal thread provided on said frame member, a lens mounted in said thread, and means for frictionally universally supporting said frame member.

5. A finder of the class described comprising an upwardly flaring casing of general rectangular cross sectional shape, a view glass screen in the upper end thereof, a line on said screen adapted to be aligned with the direction of travel, a plurality of lines on said screen at right angles to the first said line, level device adjacent said screen, a part spherical frame member, means for attaching said frame member to the lower end of said casing, a lens mounted in said frame member, and means for universally supporting said frame member.

6. In an aircraft, in combination, a view finder for use with aircraft cameras comprising a support, a view screen, a line on said screen adapted to be placed in alignment with the direction of travel, means universally and frictionally mounted in said support and holding said view screen, said means having a straight side at right angles to said line, adapted to be located adjacent to and parallel to a corresponding straight side of an aircraft camera whereby the camera may be adjusted to correspond to a previous adjustment of said view finder.

In testimony whereof I affix my signature.

ALBERT W. STEVENS.